United States Patent [19]
Heibel et al.

[11] Patent Number: 5,769,189
[45] Date of Patent: Jun. 23, 1998

[54] AUTOMOTIVE PARKING BRAKE AND PARKING BRAKE SYSTEM FOR MOTOR VEHICLES

[75] Inventors: Helmut Heibel, Moschheim; Hermann-Josef Geilen, Mendig; Werner Dieringer, Vallendar, all of Germany

[73] Assignee: Lucas Industries public limited company, United Kingdom

[21] Appl. No.: 608,628

[22] Filed: Feb. 29, 1996

[30] Foreign Application Priority Data

Mar. 3, 1995 [DE] Germany .......................... 195 07 566.8
Apr. 20, 1995 [DE] Germany .......................... 195 14 684.0

[51] Int. Cl.[6] .............................. B60T 1/06; B60T 13/74; B60T 11/04; F16D 65/21
[52] U.S. Cl. ......................... 188/156; 188/72.1; 188/2 D; 188/106 P; 188/162; 188/325
[58] Field of Search .................................. 188/72.1, 72.7, 188/72.8, 106 P, 106 A, 2 D, 106 F, 325, 156, 157, 158, 72.6, 72.9, 364, 162, 328

[56] References Cited

U.S. PATENT DOCUMENTS 3,638,766  2/1972  Besoyan .................................. 188/162
3,809,191  5/1974  Woodward ............................... 188/162
4,561,527  12/1985 Nakamoto et al. ...................... 188/2 D
4,860,859  8/1989  Yamatoh et al. ........................ 188/162
5,178,237  1/1993  Ursel et al. .............................. 188/157
5,302,008  4/1994  Miyake et al. ........................ 188/106 P

FOREIGN PATENT DOCUMENTS

4021572 C2  1/1991  Germany .
4129934 C2  3/1993  Germany .
4108058      4/1992  Japan ...................................... 188/162
9106452      5/1991  WIPO ................................ 188/106 F
WO9206876    4/1992  WIPO .

*Primary Examiner*—Douglas C. Butler
*Attorney, Agent, or Firm*—Wood, Herron & Evans, L.L.P.

[57] ABSTRACT

In order to improve an electrically actuatable automotive parking brake with mechanical emergency actuation, the brake pads (52, 54) of the parking brake, which may be either a disk brake or a drum brake, can be applied or released via gear arrangement (100) arranged within or at the brake. The gear arrangement (100) has one power input and one power output, with the power input being coupled with the one end of a flexible shaft, the other end of which being arranged remote from the brake can be coupled with a manual crank, in order to be able to actuate the parking brake mechanically in the case of a failure of the electric actuation.

23 Claims, 6 Drawing Sheets

5,769,189

AUTOMOTIVE PARKING BRAKE AND PARKING BRAKE SYSTEM FOR MOTOR VEHICLES

The invention relates to an electrically actuatable automotive parking or hand brake with mechanical emergency actuation and to a hand brake system for motor vehicles. Hand brakes for motor vehicles are conventionally actuated mechanically, e.g. by means of a hand brake lever arranged between the front seats of a motor vehicle. For the sake of convenience and in particular to keep the space between the front seats of a motor vehicle free for other items such as a cellular phone, the requirement for an electrically actuatable parking brake has recently been emphasized.

Electrically actuatable automotive hand brakes per se are known. An electrically actuatable service and parking brake is disclosed in DE 40 21 572 C2. The brake described therein, however, does not comprise a means by which the brake would be able to be applied or released in the case of a power supply failure.

From DE 41 29 934 C2 a parking brake for passenger motor vehicles is known, where two parking brakes can be applied and released by means of one electric motor. For this purpose, the electric motor activates a crank arm via a screw drive, which actuates a disk which is rotatably supported on an axle and to which two Bowden cables leading to one brake each are attached. One revolution of the electric motor causes a swivelling motion of the crank arm and thus, depending on the direction of rotation of the electric motor, a movement of the Bowden cables in the direction of application or release. In the case of a power supply failure the disclosed parking brake system can be applied or released by means of a manual crank, the rotational movement of which is converted to a linear movement via a worm, a worm gear, and a ratchet-type lock as well as a lever supported at the worm gear and transferred to a Bowden cable connected with the crank arm. As can be seen from the above description, the parking brake system disclosed in DE 41 29 934 C2 has a relatively complicated design. In addition, the emergency actuation means disclosed therein is not suited for employment in conjunction with disk brakes.

From WO 92/06876 a hydraulically actuated disk brake is known which can be used both as a service brake and as a parking brake. To achieve the parking brake function, the brake pads are hydraulically pressed against the brake disk, whereupon a knurled nut is moved against a stop by means of an electric motor in order to prevent the brake pads from clearing the brake disk when the hydraulic pressure is no longer maintained. To release the brake pads which are applied in such a manner, it is necessary to reapply hydraulic pressure in order to relieve the knurled nut, which is then moved by means of the electric motor into a position in which the brake pads are freely movable again.

An object of the invention is to create an electrically actuatable automotive parking or hand brake with mechanical emergency actuation, which, compared to known parking brakes of that type, has a considerably simplified design and which, to the greatest possible extent, is capable of being applied universally. A further object of the invention is to provide an improved parking or hand brake system for motor vehicles.

According to the invention the above object is solved by an electrically actuatable automotive parking brake comprising the features set out in claim 1. An improved parking brake system for motor vehicles comprises the features set out in claim 15.

According to the invention the design of an electrically actuatable automotive parking brake has been considerably simplified in that the mechanical emergency actuation is effected by means of a flexible shaft, one end of which is coupled with a gear arrangement which is arranged within the brake or at the brake itself. In particular, a worm gear or a counter pinion of the gear arrangement is arranged in the brake housing. The other end of the flexible shaft is adapted to be coupled with a manual crank for transferring the rotational movement of the manual crank to the gear arrangement. The thus generated rotational movement of the gear arrangement is then utilized for application or release of the brake.

The solution according to the invention is suitable both for disk brakes as well as for drum brakes. In conjunction with disk brakes, the gear arrangement advantageously comprises a worm which engages a worm gear which again is connected with a brake piston of the disk brake. The worm gear is preferably arranged coaxially with the longitudinal center axis of the brake piston, also referred to as the actuating piston, and drives a shaft arranged coaxially with the brake piston, which comprises an end portion provided with a male thread, which again engages a female thread, which is formed in a sleeve which is secured against rotation but which is translationally movable. In this manner, the rotational movement imparted by the worm gear is converted to a translational movement of the sleeve, which can be used directly for urging the brake piston in the direction of application. A rotation of the worm gear in the opposite direction causes the cancellation of the contact pressure, whereupon the brake piston retracts automatically until the brake pads clear the brake disk again. It should be ensured in each case that the sleeve is secured against rotation, because otherwise it would rotate with the shaft and not generate a translational movement.

In a preferred embodiment of the above described parking brake according to the invention, the sleeve is guided through an anti-rotation ring on which the brake piston is capable of being slidably moved in the axial direction. The sleeve can, for example, be designed in the shape of an external hexagon. The anti-rotation ring will then be provided with a corresponding internal hexagon. The anti-rotation ring is secured against rotation relative to the brake piston by a suitably designed positive engagement.

The conversion of the rotational movement of the worm gear can also be achieved by means of a ball and ramp arrangement instead of the shaft driven by the worm gear and provided with a male thread and the sleeve provided with a female thread.

With drum brakes, the gear arrangement preferably comprises a screw spindle/nut arrangement with a sleeve which partially surrounds the screw spindle. The screw spindle/nut arrangement is accommodated between the two brake shoes of the drum brake and is advantageously coupled with an electric motor so as to be rotatably driven. The rotatable coupling is preferably via a pinion/counter pinion arrangement, with the counter pinion being non-rotatably connected either with the screw spindle of the nut of the screw spindle/nut arrangement and engaging a pinion which is preferably coupled with an electric motor via a reduction gear. The nut can, for example, be connected with the counter pinion in a non-rotatable (and integral) manner. In this case, a sleeve bears upon the nut or the counter pinion, respectively, which at least partially surrounds the screw spindle and which, upon a rotational movement of the nut about the screw spindle, moves relative to it in the longitudinal direction. Depending on the direction of rotation, the screw spindle/nut arrangement then carries out either a contraction or an expansion movement. The free end of the sleeve and/or the free end of the screw spindle can each be connected with a web plate of a support of two drum brake linings. The counter pinion is then arranged on an axis parallel to the longitudinal centre axis of the actuation piston.

According to a preferred embodiment of the above described parking brake according to the invention the counter pinion preferably rotates about the screw spindle which is arranged in parallel to the brake piston and which comprises a portion provided with a male thread which is in engagement with a female thread of the counter pinion. The rotational movement imparted on the counter pinion is thus converted into a translation movement of the screw spindle, which can be directly used for pressing the brake shoes in the direction of application. A rotation of the counter pinion in the opposite direction results in the cancellation of the contact pressure acting on the brake shoes, whereupon the brake shoes automatically retract until they clear the brake drum again. The screw spindle and the sleeve are preferably arranged in such a way that they are secured against rotation between the supports of the friction linings because otherwise they would rotate together with the counter pinion and not generate a translation movement.

In an embodiment of the parking brake according to the invention the screw spindle and the sleeve are secured by means of an anti-rotation fork which is slidably connected with each web plate of a support of two brake linings. The anti-rotation fork is secured against rotation by means of a suitably designed positive engagement.

Regardless of whether the automotive parking brake comprises disk brakes or drum brakes, the other end of the flexible shaft is preferably located at a place remote from the brake, for example in the trunk of a motor vehicle or in the interior of a motor vehicle. The electrical actuation of a parking brake according to the invention can be effected by means of an electric motor, for example, which drives another worm which is in engagement with the worm gear, or another pinion cooperating with the counter pinion. With such an embodiment the electric motor is therefore arranged in the immediate vicinity of the brake or secured to it, respectively. A modified solution is to have the electric motor drive the other, i.e. the end of the flexible shaft remote from the brake, in order to apply or to release, respectively, the brake via the already existing worm utilized for the mechanical emergency actuation or via the pinion utilized for the mechanical emergency actuation, respectively.

In a preferred embodiment of the automotive parking brake according to the invention the one end of the flexible shaft, i.e. the end at the brake side, is connected with one end of the armature shaft of an electric motor which is secured to the brake, said shaft also driving the gear arrangement. In particular, the armature shaft of the electric motor drives the worm or the pinion, respectively, of the gear arrangement. In the standard case, the electric motor of such an embodiment drives the worm or the pinion, respectively, for the application and release of the parking brake. In the case of a power failure, the flexible shaft can be rotated by means of the manual crank so that the shaft effects the rotation of the armature of the electric motor and thus the worm or the pinion, respectively. Depending on the selected direction of rotation, the parking brake according to the invention can thus be applied or released.

In a preferred embodiment of the automotive parking brake according to the invention the other end of the flexible shaft is connected with a plate-shaped ring gear, and the manual crank comprises a bevel gear which can be brought into engagement with the ring gear, for example by pushing.

Such an embodiment permits the flexible shaft to narrowly extend to a point below the location where the manual crank is to be used in an emergency. In particular, it is possible to arrange the flexible shaft in such a manner that it extends to a conveniently accessible point in the interior of a motor vehicle, preferably into the space between the two front seats. The other end of the flexible shaft can also be arranged there, e.g. hidden under a hinged cover. In an emergency, all that has to be done is to open the hinged cover, and the emergency actuation of the parking brake can then be carried out by means of a manual crank which is stored, for example, in the car's glove box. Normally, the actuation of the parking brake according to the invention is effected by an electrical switch which controls the current supply to said electric motor and which is arranged, for example, in the instrument panel of the motor vehicle. In order to eliminate the need for separate storage of the manual crank which is required for an emergency actuation, a preferred embodiment of the parking brake according to the invention provides for the bevel gear of the manual crank to be resiliently biased while disengaged from the ring gear and for the manual crank to be pivotable about an axis which extends perpendicularly to the centre axis of the bevel gear, and to comprise a cam which, upon swivelling the manual crank from a rest position into an actuation position, directly or indirectly engages the rear side of the bevel gear and thus urges the bevel gear against the resilient bias into engagement with the ring gear. In this embodiment, the manual crank is consequently not stored separately, but rather can be swivelled about an axis into a rest position or into an actuation position, respectively. Upon swivelling into the actuation position, the bevel gear and the ring gear are automatically brought into engagement. The transisition from the rest position into the actuation position is preferably made by swivelling the manual crank through 180° about said axis.

Since two parking brakes are, in general, employed in motor vehicles, a parking brake system for motor vehicles is characterized in that two of the above described parking brakes are used for one and the same axle of a motor vehicle, one each on either side of the motor vehicle. In order to enable the two flexible shafts to be rotated together by means of a single manual crank in an emergency, the other ends of each flexible shaft are rotatably coupled, for example, via two gears. One of these gears can be the ring gear which in an emergency actuation comes into engagement with the bevel gear of the manual crank.

In a particularly preferred embodiment of the parking brake system according to the invention, a differential gear with one input and two outputs is provided. The input of the differential gear can be driven by means of the manual crank, while the two flexible shafts are connected with one output each of the differential gear. Such an embodiment is advantageous in that the two parking brakes are applied equally firmly.

According to an embodiment of the parking brake system according to the invention the ring gear is non-rotatably connected with the housing of the differential gear and thus forms the input of the differential gear. Although preferred embodiments of the parking brake system according to the invention comprise a separate electric motor at each parking brake, it is also possible to have a single electric motor acting on the ring gear which is securely connected with the housing of the differential gear. As a result of the differential gear, it is also possible to build up a uniform application force with only one electric motor.

Two embodiments of a parking brake according to the invention and of a parking brake system according to the invention will be explained in the following with reference to the schematic drawings, in which.

Figure 1:
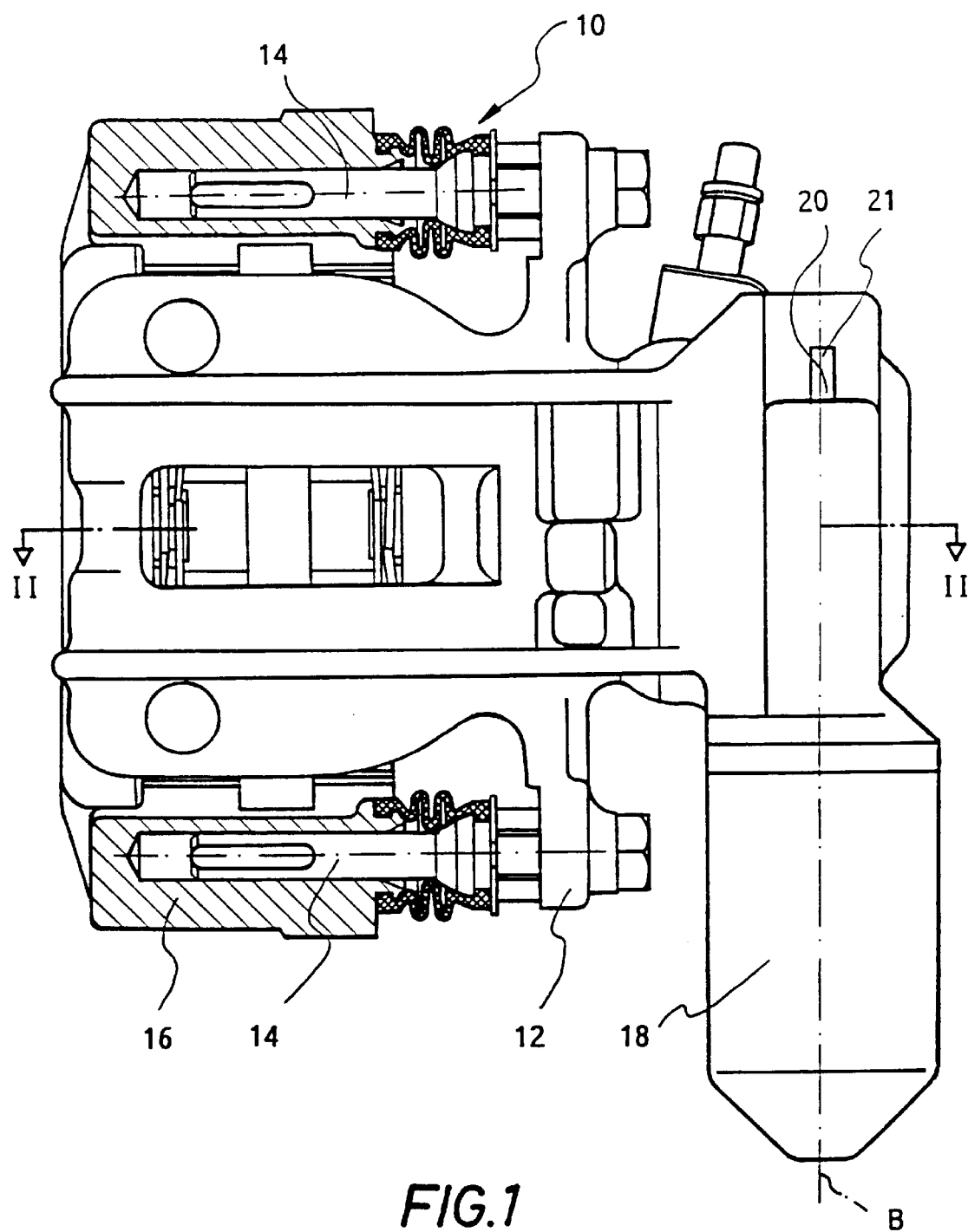
FIG. 1 shows the plan view of a spot-type sliding-caliper disk brake illustrated partially sectioned with an electrically actuatable parking brake.

FIG. 1 shows a spot-type sliding-caliper disk brake for motor vehicles which is generally identified with reference numeral 10 and which comprises a brake carrier 12, two guide pins 14 attached thereon and a sliding caliper 16 which is movably guided on the guide pins 14. The spot-type sliding-caliper disk brake 10 is designed in a manner which is typical for this type of brake so that in the following only those details which differ from the usual brake designs of the mentioned type will be described in greater detail.

The spot-type sliding-caliper disk brake 10 is equipped with an electrically actuatable parking brake. For this purpose, an electric motor 18 is secured to the brake carrier 12, the armature shaft 20 of which drives a worm 22 which engages a worm gear 24 which is rotatably supported at the housing of the brake 10 (see FIG. 2).

Figure 2:
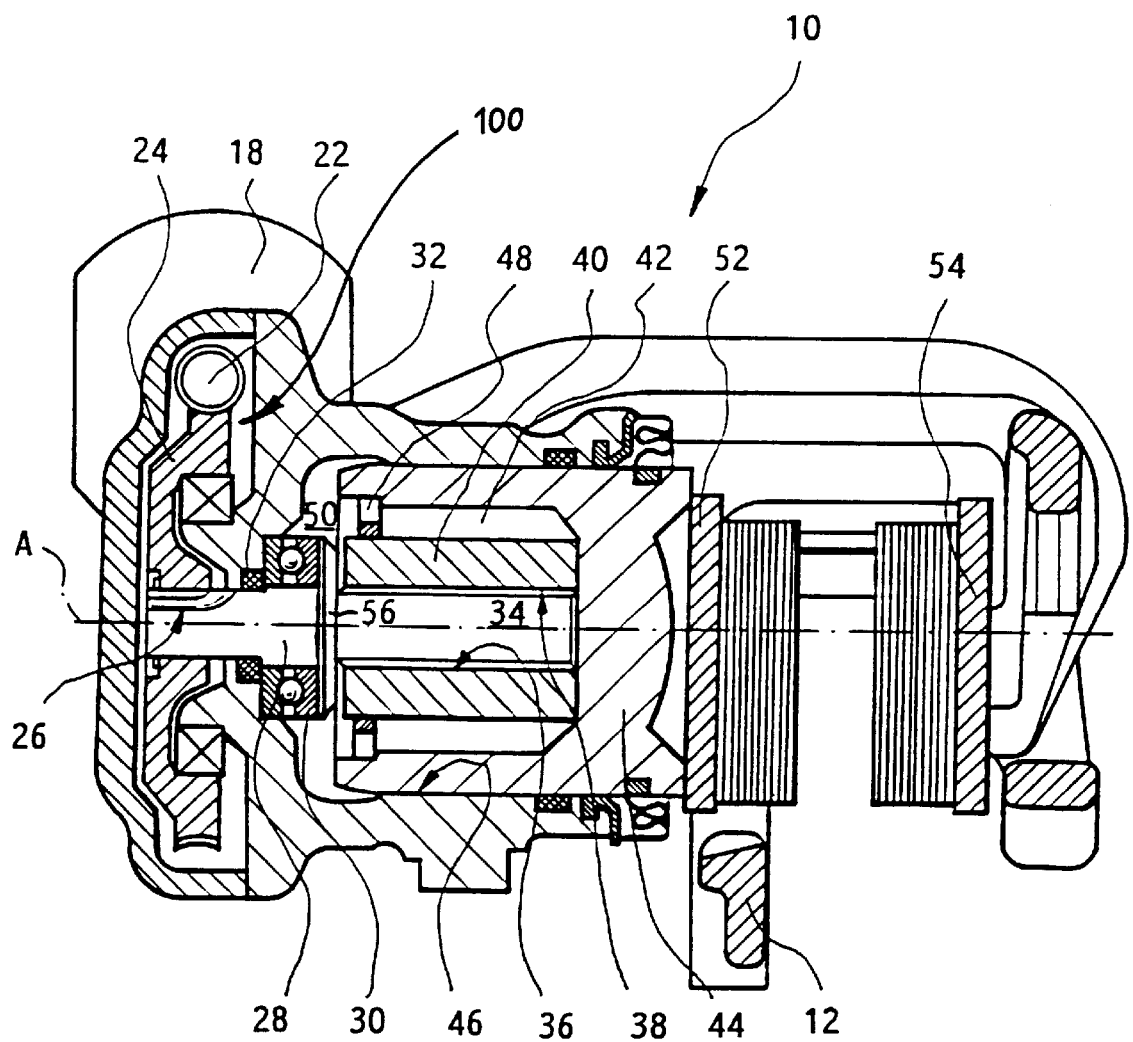
FIG. 2 shows the section II-II from FIG. 1.

As can be seen from FIG. 2, the worm gear 24 is tightened to the left end (in FIG. 2) of a shaft 28 via a tongue and groove connection at 26, with the shaft being rotatably supported in the housing of the brake 10 by means of a ball bearing 30. The through hole for the shaft 28 in the housing of the brake 10 is sealed in a fluid-tight manner by means of a seal 32. The shaft 28 has a longitudinal axis A which extends at a right angle to an axis B of the armature shaft 20. Thus the axis B extends at least essentially parallel to a brake disk (not shown here) of the brake 10. The other end of the shaft 28 is formed by an end portion 34 with a male thread 36 which engages a female thread 38 of a sleeve 40 which is arranged coaxially with the shaft 28 and which has a length which approximately corresponds to the length of the end portion 34. The sleeve 40 is completely accommodated in a cup-shaped recess 42 of a brake or actuation piston 44 of the brake 10, which is also arranged coaxially with the shaft 28 and which is accommodated in a hole 46 of the brake housing.

An anti-rotation ring 48 is arranged radially between the sleeve 40 and the brake piston 44 in the cup-shaped recess 42. The anti-rotation ring 48 through which the sleeve 40 extends provides a positive engagement between the outside of the sleeve 40 and the inside of the brake piston 44 which is formed by the cup-shaped recess 42 in order to prevent the sleeve 40 from rotating. The outside of the sleeve 40 can, for example, be formed as an external hexagon, while the anti-rotation ring 48 is provided with a corresponding internal hexagon. Anti-rotation locking of the ring 48 relative to the brake piston 44 is achieved by means of a positive engagement, for example, of two projections (not shown) in the cup-shaped recess 42, which engage the anti-rotation ring 48. It must, however, be ensured that the brake piston 44 can slide along the anti-rotation ring 48 in the axial direction.

The brake piston 44 is movable along the axis A within the hole 46 and sealed against the hole 46 at its right end (FIG. 2) in the usual manner. When using the brake 10 as a vehicle service brake, the brake piston 44 is moved by fluid pressure. The fluid pressure is transferred to the brake piston 44 by means of a pressurized hydraulic fluid which is fed via a supply line (not shown) to an expanded portion 50 of the hole 46 and which moves the brake piston 44 with reference to FIG. 2 to the right in order to urge a brake pad 52 against the brake disk (not shown). This causes an opposite brake pad 54 to also be pressed against the brake disk.

When using the brake 10 as a parking brake, the brake pads 52, 54 are normally applied or released, respectively, by means of the electric motor 18. If the user of a motor vehicle actuates a switch for the parking brake, which, for example, is arranged in the instrument panel, the electric motor 18 starts to rotate in the direction of application, the worm 22 driven by its armature shaft 20 transfers the rotational movement to the worm gear 24. The shaft 28 and its end portion 34 with the male thread 36 rotate together with the worm gear 24. The sleeve 40 locked against rotation by the anti-rotation ring 48 thereby unscrews itself from the end portion 34 of the shaft 28 and thus mechanically urges the brake piston 44 to the right (FIG. 2) which causes the brake pads 52, 54 to be pressed against the brake disk. For the dissipation of the counterforce generated by this pressing operation into the housing of the brake, the shaft 28 comprises a dish-shaped portion 56 with increased diameter between the sleeve 40 and the ball bearing 30, which dissipates the reaction force generating during the pressing operation via the bearing shells of the ball bearing 30 into the housing of the brake 10. A special locking of the brake 10 so applied mechanically is not required because the male thread 36 and the female thread 38 and/or the worm gear are designed so as to be self-locking.

In order to release the mechanically applied brake 10 the electric motor 18 is operated in the opposite direction of rotation, whereupon the sleeve 40 again screws itself onto the male thread 36 of the shaft 28 and thus relieves the brake piston 44. The mere spring forces transferred by the seals on the brake disk side cause the brake piston 44 to move slightly backwards, i.e. to the left in FIG. 2, thus resulting in the parking brake being released.

Figure 3:
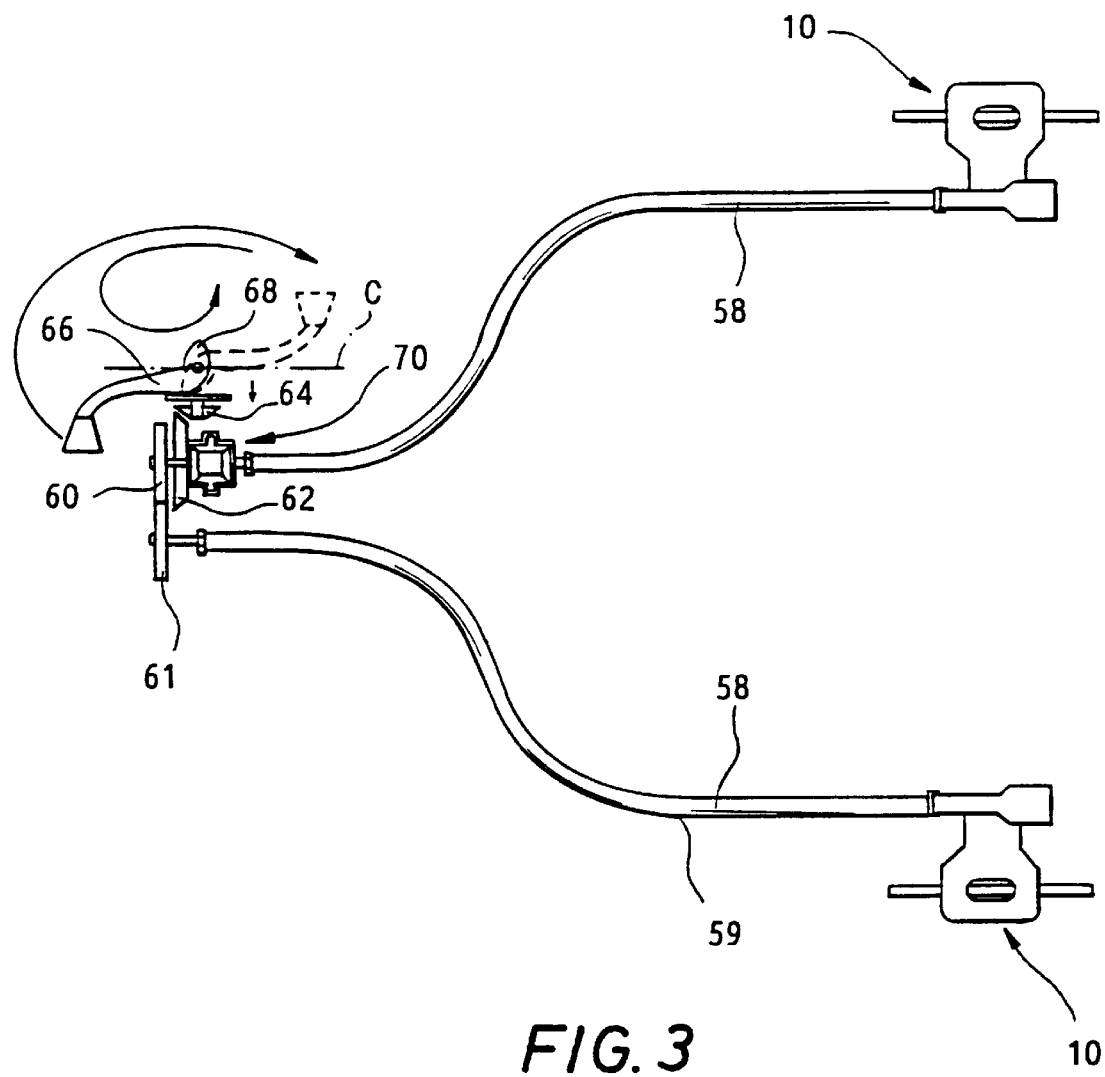
FIG. 3 shows a parking brake system with two parking brakes according to FIGS. 1 and 2.

In the following, the mechanical emergency actuation of the previously described brake 10 will be described in more detail with reference to a vehicle brake system, which comprises two of the previously described brakes 10 at one axle (see FIG. 3). In order to enable the application and release of the parking brake whenever no current is available for the electric motors 18, the free end 21 of the armature shaft 20 (see FIG. 1) of each electric motor 18 is coupled with one end of a flexible shaft 58, the other end of which extends into the interior of the motor vehicle, for example into the space between the two front seats. For coupling with the flexible shaft, the free end 21 of the armature shaft 20 is formed as a square, onto which a corresponding connection piece of the flexible shaft 58 can be slid. The flexible shaft may also comprise a sleeve 59 which is designed in such a way that the brake side end of the sleeve engages on the brake. The two ends of the flexible shafts 58, which are arranged in the interior of the motor vehicle, are coupled by means of two engaging gears 60, 61. A ring gear 62 can be brought into engagement with a bevel gear 64 which is secured at a manual crank 66 which can be swivelled about an axis C. The position of the manual crank 66 shown by solid lines in FIG. 3 represents the rest position of same, while the position of the manual crank 66 shown by broken lines represents the actuation position of same . At the end opposite the handle side end of the manual crank 66, a cam 68 is formed which, upon swivelling the manual crank 66 from the rest position to the actuation position, causes the bevel gear 64 resiliently biased in an upward direction (FIG. 3) to be urged into engagement with the ring gear 62. Rotation of the manual crank 66 into its actuation position then results in the rotation of the two flexible shafts 58 and thus, depending on the selected direction of rotation, in the application or release of the parking brake.

Figure 4:
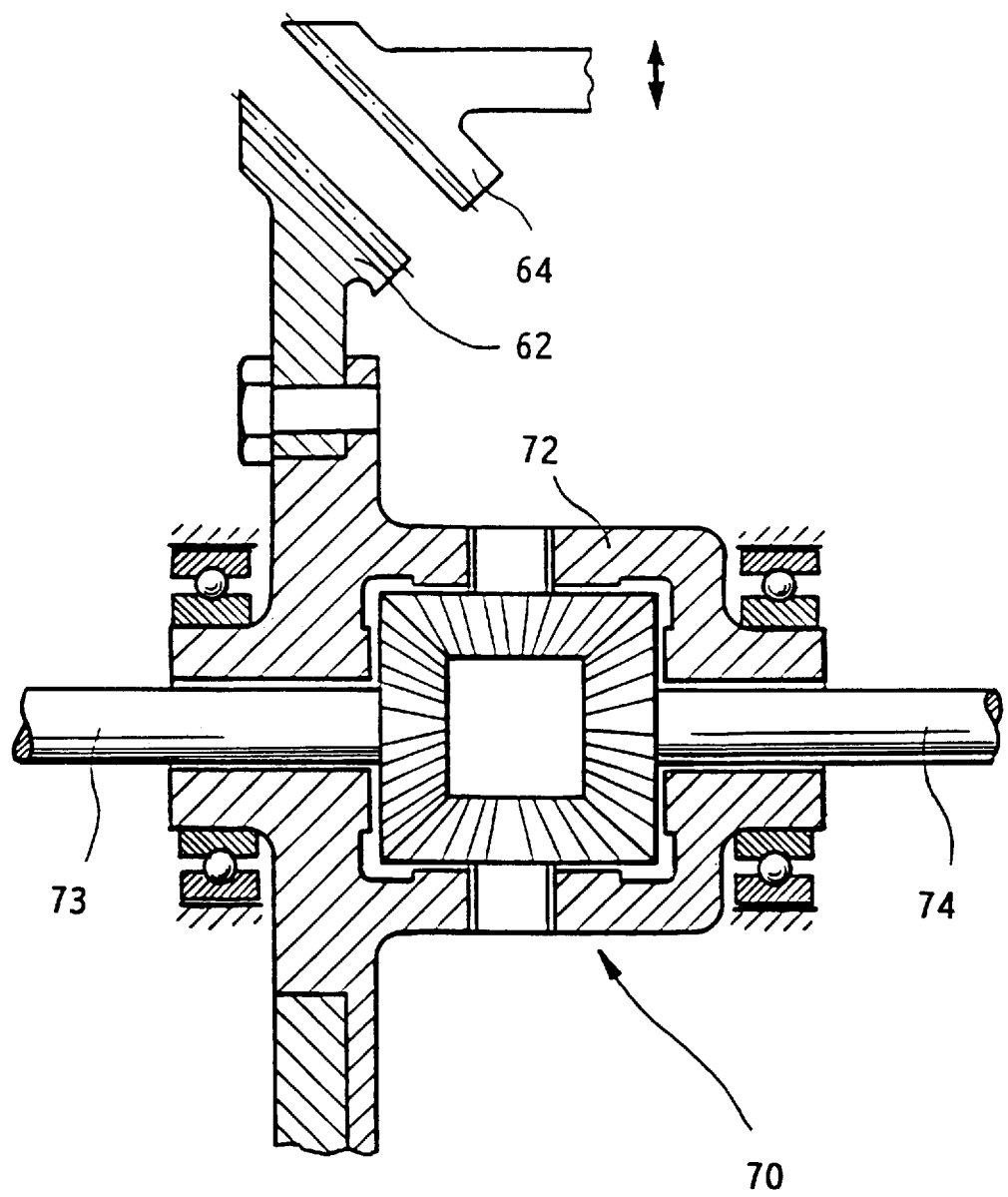
FIG. 4 shows an enlarged, more accurate illustration of the differential gear used in the parking brake system according to FIG. 3.

In order to provide for a uniform application of the parking brake on either axle side upon rotation of the manual crank 66 in the case of a power supply failure, a differential gear 70 with one input and two outputs is provided which is shown in greater detail in FIG. 4.

As can be seen from FIG. 4, the ring gear 62 is tightened to a rotatably supported housing 72 of the differential gear 70. The ring gear 62 thus constitutes the input of the differential gear. Two output shafts 73, 74 serving as outputs of the differential gear extend through the housing 72, the r.h. output shaft 74 of which (FIG. 4) is connected with the flexible shaft 58 which leads to the brake 10 shown in the upper portion of FIG. 3. The other output shaft 73 drives the gear 60 shown in the upper portion of FIG. 3, which transfers its rotational motion via the second gear 61 to the second flexible shaft 58 which leads to the brake 10 shown in the bottom portion of FIG. 3.

The incorporation of the differential gear 70 into the parking brake system ensures that regardless of the resistances occurring during application the two parking brakes are applied uniformly. In the illustrated arrangement of the parking brake system, the two flexible shafts 58 rotate even then when the parking brakes are electrically actuated by the electric motors 18. This, however, does not bring about any further effects because the bevel gear 64 of the manual crank 66 is in engagement with the ring gear in the case of a power failure only, while otherwise, i.e. in the rest position of the manual crank 66, it is resiliently biased so as to be disengaged with the ring gear 62. In order to keep the actuation force of the parking brake system to be applied to a minimum, the electric motors 18 are preferably of a type without permanent magnets.

Figure 5:
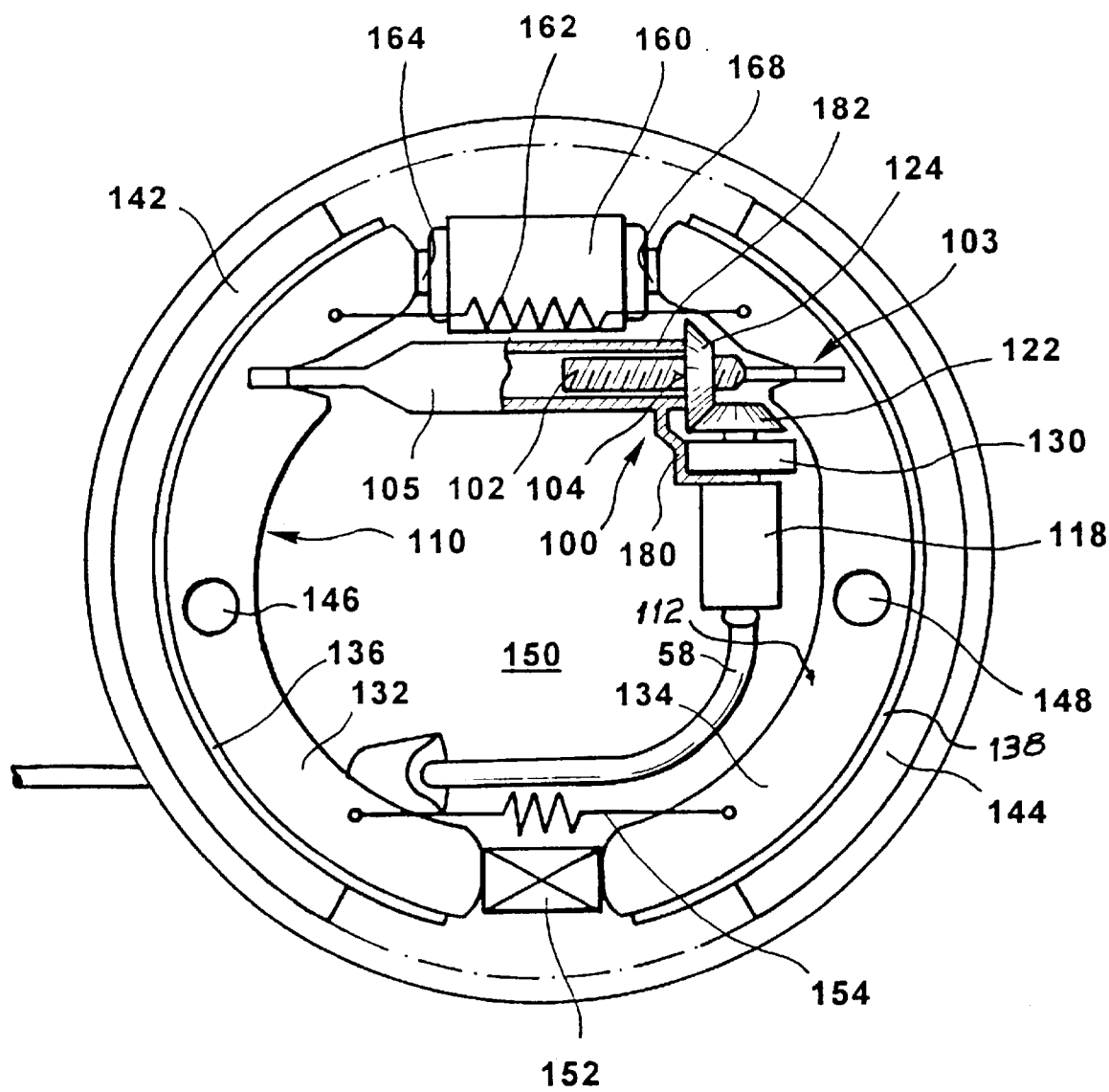
FIG. 5 shows the plan view of a drum brake illustrated partially sectioned with an electrically actuatable parking brake.
Figure 6:
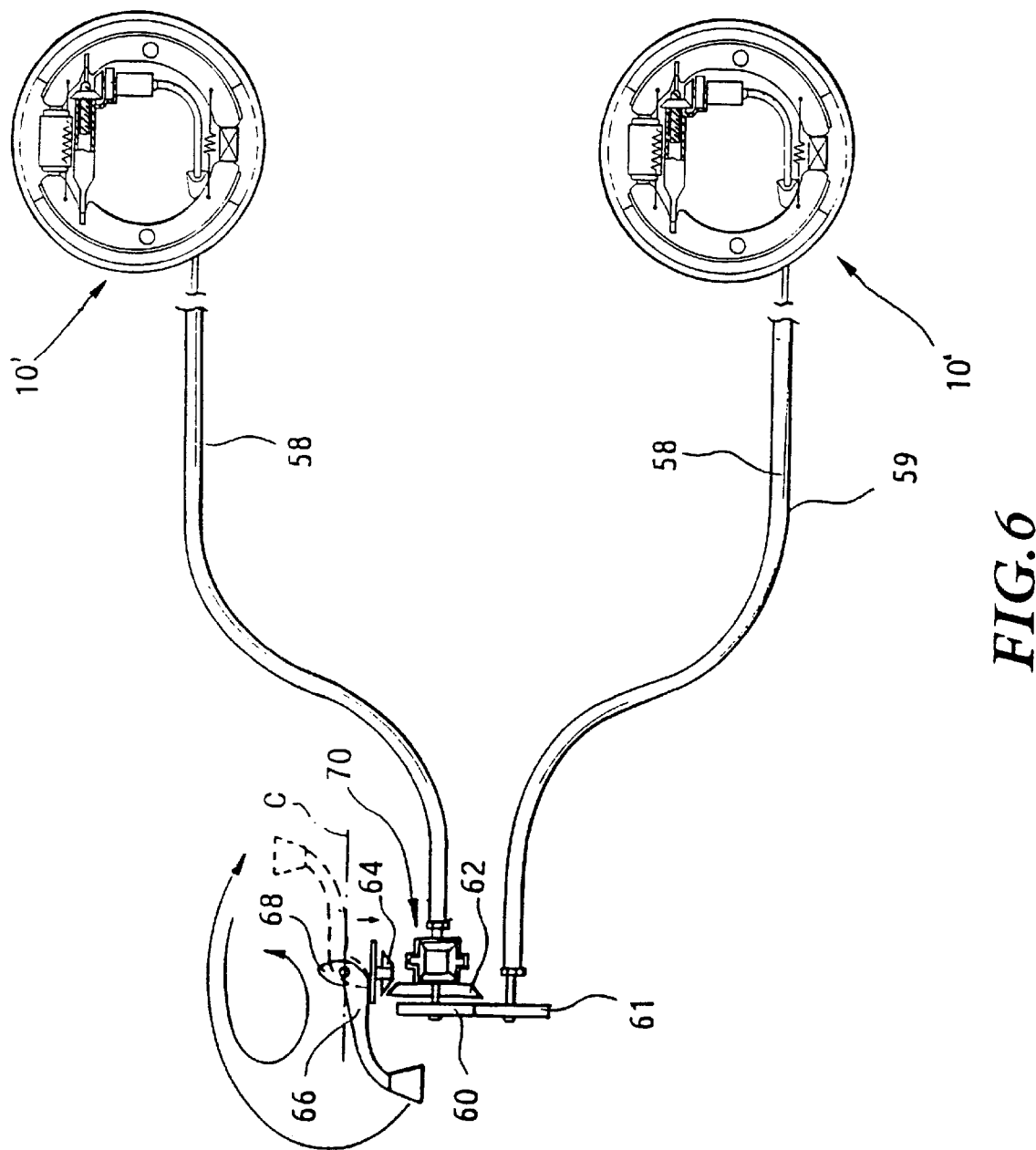
FIG. 6 shows a parking brake system with two parking brakes according to FIG. 5.

FIGS. 5 and 6 show a second embodiment of an automotive parking brake and a parking brake system which differs from the previously described first embodiment in that drum brakes are employed instead of disk brakes.

FIG. 5 shows a drum brake for motor vehicles which is generally identified with reference numeral 10' and which comprises an anchor plate 150, two brake shoes attached thereon and a wheel brake cylinder. The drum brake 10' also has a design which is typical for this type of brake so that in the following only those details will be described in greater detail which differ from said construction.

Similar to the disk brake 10 of the first embodiment, the illustrated drum brake 10' is equipped with an electrically actuatable parking brake. The drum brake 10' comprises two brake shoes 110, 112, at the supports 136, 138 of which one web plate 132, 134 is arranged which extends radially inward, and at the outer circumference of which one friction lining 142, 144 each is arranged.

The two brake shoes 132, 134 are movably defined by holding down means 146, 148 relative to and coplanar with the anchor plate 150. At their respective one end (FIG. 5 bottom) the two semi-circular brake shoes 110, 112 bear against each other via a support bearing 152 and are contracted towards each other by a first brake shoe return spring 154. The respective other ends of the brake shoes 110, 112 (FIG. 5 top) bear against each other via a hydraulic twin piston wheel brake cylinder 160, 152 and are contracted towards each other by a second brake shoe return spring 162. Parallel to the centre axis of the two actuation pistons 164, 168 of the twin piston wheel brake cylinder 160, a screw spindle sleeve arrangement 102, 105 is provided which is offset towards the centre of the drum brake 10'. The free end of the sleeve 105 or the free end 103 of the screw spindle 102 is connected so as to be secured against rotation with one of the two web plates 132, 134. For this purpose, the respective free ends have a flattened and slotted design, which results in a fork-shaped configuration. These fork-shaped ends surround one projection each of the corresponding web plate. The screw spindle 102 carries a nut 104 which comprises a counter pinion 124 at its outer circumference, which engages a pinion 122. In the illustrated embodiment the pinion 122 and the counter pinion 124 are designed as bevel gears so that the two pinions 122 and 124 constitute an angle drive.

The pinion 122 is coupled, via a reduction gear 130, with an electric motor 118, which is rigidly and non-rotatably connected to the sleeve 105 via a flange 180. The sleeve 105 bears against the counter pinion 124 via a bearing indicated by 182. In addition, the complete gear arrangement 100 can be encapsulated in a dust-tight manner by the sleeve 105 in order to prevent abraded material from the friction linings 142, 144 to detrimentally affect the function of the electric motor 118, the reduction gear 130, the pinion 122, the counter pinion 124, the screw spindle 102, or the nut 104.

In order to release the mechanically applied drum brake 10' the electric motor 118 is activated, whereupon the counter pinion 124 screws itself on the screw spindle 102 in an outward direction (towards the free end 103 of the screw spindle 102) and thus relieves the brake shoes 110, 112. The friction linings 142, 144 then move slightly backwards due to the tension forces of the shoe return sping so that the parking brake is released.

The parking brake system shown in FIG. 6 differs from that in FIG. 3 only in that two drum brakes 10' are employed instead of two disk brakes. As in the case of the parking brake system according to FIG. 3 the free end of the armature shaft of each electric motor 118 is coupled with the one end of a flexible shaft 58. The mechanical emergency actuation of the parking brake system according to FIG. 6 is therefore effected in the same manner as described in connection with FIG. 3.

We claim:

1. An electrically actuatable automotive parking brake with mechanical emergency actuation, characterized in that the parking brake is one of a disk brake (10) including brake pads (52, 54) and a drum brake (10') including brake shoes (110, 112) which can be applied and released by means of a gear arrangement (100) which is arranged at the brake and which comprises one power input and one power output, with the power input of the gear arrangement (100) being coupled with one end of a flexible shaft (58), the other end of which is arranged remote from the brake and is adapted to be coupled with a manual crank (66), in order to be able to mechanically actuate the parking brake in the case of a failure of the electrical actuation.

2. An automotive parking brake according to claim 1, characterized in that the one end of the flexible shaft (58) is connected with one end (21) of an armature shaft (20) of an electric motor (18; 118) which is secured to the brake and which also drives the gear arrangement (100).

3. An automotive parking brake according to claim 1, characterized in that the parking brake is a disk brake and the gear arrangement (100) comprises a worm (22) which engages a worm gear (24) which is connected with a brake piston (44) of the disk brake.

4. An automotive parking brake according to claim 3, characterized in that a armature shaft (20) of a motor (18) rotatingly drives the worm (22).

5. An automotive parking brake according to claim 3, characterized in that the worm gear (24) drives a shaft (28) which is arranged coaxially with a brake piston (44) and which comprises an end portion (34) provided with a male thread (36) which is in engagement with a female thread (38) formed at a sleeve (40) which is secured against rotation and movable in the direction of translation.

6. An automotive parking brake according to claim 5, characterized in that the sleeve (40) extends through an anti-rotation ring (48) on which the brake piston (44) is slidably movable in an axial direction.

7. An automotive parking brake according to claim 1, characterized in that the parking brake is a drum brake and the gear arrangement (100) comprises a screw spindle/nut arrangement (102, 104), which is accommodated between two brake shoes (110, 112) and coupled with an electric motor (118), so as to be rotatingly driven.

8. An automotive parking brake according to claim 7, characterized in that the nut (104) comprises a counter pinion (124) at an outer circumference thereof, the rotation of which effects an expansion or contraction movement of the screw spindle/nut arrangement (102, 104) so that the counter pinion (124) engages a pinion (122) which is coupled with the electric motor (118) via a reduction gear (130).

9. An automotive parking brake according to claim 8, characterized in that pinion (122) and the counter pinion (124) form an angle drive.

10. An automotive parking brake according to claim 8, characterized in that a sleeve (105) bears against the nut (104) with the counter pinion (124), which at least partially surrounds the screw spindle (102) and, together with same, is adapted to impart the expansion or contraction movement upon the rotation of the nut (104).

11. An automotive parking brake according to claim 10, characterized in that the free end of the sleeve (105) and the free end of the screw spindle (102) are connected, and at least one of the free ends is secured against rotation, with one web plate (132, 134) each of a support (136, 138) of two drum brake linings (142, 144).

12. An automotive parking brake according to claim 1, characterized in that the other end of the flexible shaft (58) is connected with a ring gear (62) and the manual crank (66) comprises a bevel gear (64) which can be brought into engagement with the ring gear (62).

13. An automotive parking brake according to claim 12, characterized in that the bevel gear (64) is resiliently biased while disengaged from the ring gear (62) and the manual crank (66) is pivotable about an axis (C) which extends perpendicularly to the centre axis of the bevel gear (64) and comprises a cam (68) which, upon swivelling the manual crank (66) from a rest position into an actuation position, directly or indirectly, engages the rear side of the bevel gear (64) and thus urges the bevel gear against the resilient bias into engagement with the ring gear (62).

14. A parking brake system for motor vehicles, comprising two automotive parking brakes, each parking brake being one of a disk brake (10) including brake pads (52, 54) and a drum brake (10') including brake shoes (110, 112) which can be applied and released by means of a gear arrangement (100) which is arranged at the brake and which comprises one power input and one power output, with the power input of each gear arrangement (100) being coupled with one end of a flexible shaft (58), the other end of which is arranged remote from the brake and is adapted to be coupled with a manual crank (66). in order to be able to mechanically actuate the parking brake in the case of a failure of the electrical actuation; and wherein the two parking brakes are associated with one and the same axle of a motor vehicle, and the flexible shafts (58) of the parking brakes are rotatably coupled at the other end of each flexible shaft, so as to be mechanically actuatable together by means of the manual crank (66).

15. A parking brake system for motor vehicles according to claim 14, characterized in that the two flexible shafts (58) are connected with one output each of a differential gear (70) and the input of the differential gear can be driven by means of the manual crank (66), the manual crank (66) driving the input of the differential gear (70) via a ring gear (62) which is connected with a housing (72) of the differential gear (70) in a non-rotatable manner.

16. A parking brake system according to claim 14, wherein the one end of each flexible shaft (58) is connected with one end (21) of an armature shaft (20) of an electric motor (18, 118) which is secured to the brake and which also drives the gear arrangement (100).

17. A parking brake system according to claim 14, wherein each parking brake is a drum brake and each gear arrangement (100) comprises a screw spindle/nut arrangement (102, 104), which is accommodated between two brake shoes (110, 112) and coupled with an electric motor (118) so as to be rotatingly driven.

18. A parking brake system according to claim 14, wherein each parking brake is a disk brake and each gear arrangement (100) comprises a worm (22) which engages a worm gear (24) which is connected with a brake piston (44) of each disk brake.

19. A parking brake system according to claim 16, wherein each parking brake is a disk brake and each gear arrangement (100) comprises a worm (22) which engages a worm gear (24) which is connected with a brake piston (44) of each disk brake.

20. A parking brake system according to claim 19, wherein the armature shaft (20) of the electric motor (18) rotatingly drives the worm (22) of each gear arrangement (100).

21. A parking brake system according to claim 20, wherein the worm gear (24) of each disk brake drives a shaft (28) which is arranged coaxially with the brake piston (44) and which comprises an end portion (34) provided with a male thread (36) which is in engagement with a female thread (38) formed at a sleeve (40) which is secured against rotation and movable in the direction of translation.

22. A parking brake system according to claim 21, wherein the sleeve (40) of each disk brake extends through an anti-rotation ring (48) on which the brake piston (44) is slidably movable in an axial direction.

23. A parking brake system for motor vehicles according to one of claims 16–18, characterized in that the two flexible shafts (58) are connected with one output each of a differential gear (70) and the input of the differential gear can be driven by means of the manual crank (66).

* * * * *